United States Patent [19]

Hughs

[11] 4,307,532

[45] Dec. 29, 1981

[54] BAIT GRIPPING LEADER

[76] Inventor: Milton K. Hughs, 9707 S. Gessner, #1003, Houston, Tex. 77071

[21] Appl. No.: 159,817

[22] Filed: Jun. 16, 1980

[51] Int. Cl.³ ............................................. A01K 83/06
[52] U.S. Cl. ...................................................... 43/44.4
[58] Field of Search ........................... 43/44.2, 44.4, 87

[56] References Cited

U.S. PATENT DOCUMENTS 2,333,503  11/1943  Worden ............................... 43/44.4
2,982,049  5/1961  Yost ..................................... 43/44.4
3,197,912  8/1965  Kramer ................................ 43/44.4

Primary Examiner—Jimmy C. Peters
Attorney, Agent, or Firm—Guy E. Matthews

[57] ABSTRACT

A novel fishing leader having adjustable loops for gripping a bait. A tubular sleeve, slidable relative to the line, as a fishing hook mounted in an opening in the sleeve. The sleeve and hook are slidable to close the loop and grip a bait securely therein adjacent the hook, without injuring the bait.

7 Claims, 5 Drawing Figures

BAIT GRIPPING LEADER

BACKGROUND OF THE INVENTION

1. Field of the Invention

This invention relates to leaders for attaching a fishing hook and bait to a fishing line, and more particularly to a novel leader for securely gripping a replaceable bait and positioning it adjacent a fishing hook, without the necessity of mounting the bait on the hook.

2. Description of the Prior Art

It is well known in the fishing arts, and particularly in fishing using live baits, to attach a leader to the end of the fishing line and a hook to the end of the leader. The leader may be lighter than the line itself, to prevent breaking the line, or of a stronger or different material, to prevent, for example, abrasion of the line or kinking.

The various ways for attaching a bait to a leader known in the art fall into two general catagories. The first involves puncturing the bait with the hook. The hook is usually mounted through the body of the bait, or in the case of a minnow, through the lips. The second catagory invloves attaching the leader itself to the bait, for example, by wiring, tying or sewing the leader and hook to the bait. One apparatus known to Applicant comprises a safety pin like clip mounted on the leader. The bait is attached by opening the clip, threading the clip wire through the minnow's lips, and closing the clip to retain the bait.

Several problems and disadvantages are apparent in the prior art leaders, particularly where the fisherman is using live bait. Hooking through a bait, such as a live shrimp or minnow, obviously injures the bait. Casting often causes the hook to tear through the bait and weaken the connection thereto. Many baits, such as shrimp, are not tough enough to insure a good connection to the hook. The same is true when hooking a minnow through the lips.

It is therefore comparatively easy for a game fish to strip the bait from the hook by tearing it off; a situation often encountered by bait fisherman. Hooking the bait further injures the bait, decreasing its liveliness, and its appeal to game fish. Improperly hooking the bait may even kill the bait. The many fishing publications decribing the correct way to hook a live bait are compelling evidence of this problem.

Hooking a bait in a conventional manner, such as through the back, places the bait at the end of the fishing rig, with the hook above the bait. It is desirable to present the bait to the fish so the point of the hook or hooks is adjacent the body of the bait so the bait and hooks are ingested by the game fish together.

The other methods of attaching a bait to the leader known to the Applicant are equally disadvantages for the same reasons set out above. Wiring, tying, or sewing the leader to the bait is not practical with live bait. For example, sewing the hook and leader in involves cutting or otherwise inserting the hook into the body cavity of the bait and sewing the hook eye or a part of the leader to the bait to secure it firmly, preventing use of live bait.

SUMMARY OF THE INVENTION

It is an object of the present invention to provide a leader for gripping a bait adjacent a fishing hook which secures the bait without puncturing or injuring it.

It is a further object of the invention to provide an inexpensive leader for securing a bait which positions the point of the hook adjacent the body of the bait to increase the probability of game fish ingesting the hook.

It is a further object of the invention to provide a leader having single or multiple adjustable loops for securing a bait positioned around and closed over the bait to position the hook at any desired point on the body of the bait.

These and other objects, advantages, and features are accomplished by providing a leader for a fishing line having an end forming an adjustable loop. An adjustment sleeve positioned about the line sections of the loop is slidable toward the loop to close it, or away from it to open the loop. A bait is positioned in the open loop and the loop is closed to securely grip the bait without injury.

A fishing hook may be mounted for movement with the sleeve, in which case one segment of the line in the sleeve is mounted through the eye of the hook so the hook is constrained to move with the sleeve.

In another embodiment, a multiple loop configuration is provided, which includes a second sleeve for maintaining the multiple loop configuration. The line segments leave the adjustment sleeve and enter a central opening in the second sleeve. The line is looped twice, or more, back through the second sleeve.

The loops are adjustable in size by sliding the adjustment sleeve toward or away from the loop. A bait is cinched tightly in the loops by sliding the adjustment sleeve to close the loops. In this multiple loop configuration, the bait is even more securely gripped than in the single loop embodiment. Means for preventing the first sleeve from slipping and allowing the loop to loosen may be provided in the body of the first sleeve.

In the preferred embodiment, the first sleeve includes a slot formed in the body of the adjustment sleeve for receiving the eye of a fishing hook. Angling the slot with respect to the longitudinal axis of the adjustment sleeve permits the point, or points, of the hook to be positioned adjacent to the bait.

DESCRIPTION OF THE PREFERRED EMBODIMENT

Figure 1:
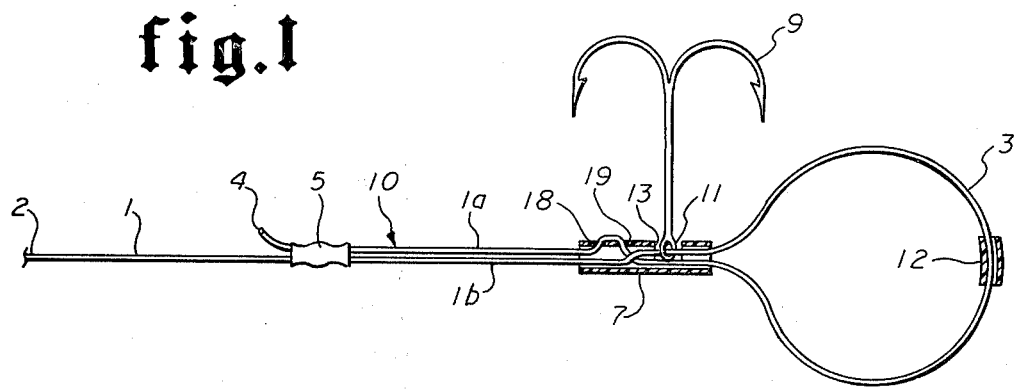
FIG. 1 is a partial sectional view of an embodiment of the leader of the invention.

FIG. 1 illustrates an embodiment of the leader 10 of the invention having a single loop for gripping a bait. The leader 10 has a first end 2 for attachment to a typical fishing line. (not shown). The opposite end of the leader is doubled so that an end 4 of the leader line 1 may be secured, preferably by a crimped sleeve 5, to the leader line 1 to form a loop 3. The leader line 1 may be any of the well known leader materials, such as monifilament or stranded or solid wire. Nylon monifilament is particularly suitable for the leader of the invention due to its low visibility and resistance to kinking.

An adjustment body 7 defines an adjustable loop 3 at the second end of the leader 10. The adjustment body 7 is preferably an elongate tube or sleeve having both line segments 1a and 1b through the tube. The adjustment sleeve preferably has a slot or opening 13 formed in it to receive a hook 9. The eye 11 of the hook 9 is mounted in the opening 13 and one of the line segments 1-b is threaded therethrough, securely attaching the hook 9 to the leader 10.

The loop 3 is adjusted in size by sliding the adjustment sleeve 7, and thus the hook 9, on the leader 10. Moving the sleeve 7 toward the loop will close the loop 3 to grip a bait (not shown). Movement of the sleeve away from the loop naturally opens the loop 3 to prepare to attach a new bait.

The adjustment sleeve 7 preferably includes two openings 18, 19 through the wall of the sleeve 7. Threading one line segment 1a through the opening 18, outside the tube, and back through opening 19 prevents slipping of the sleeve and thus loosening of the loop around the bait by adding frictional resistance to movement of the adjustment sleeve 7 on the leader 10. The opening 18, 19 may be holes or slits in the body of the adjustment sleeve 7. The leader of the invention has been found to function quite well with an adjustment sleeve 7 formed of a resilient plastic tube. In such case, piercing the wall of the tube to form openings 18, 19 securely locates the adjustment sleeve 7 in the leader.

The loop 3 preferably includes a tube 12 or the like, such as a ring, around the line of loop 3 to simplify opening the loop. The tube 12 is preferably slidable on the loop so the adjustment sleeve 7 may be held in one hand and the tube 12 held in the other and to pull the lines 1a, 1b, uniformly through the adjustment sleeve 7 and open the loop 3.

Figure 3:
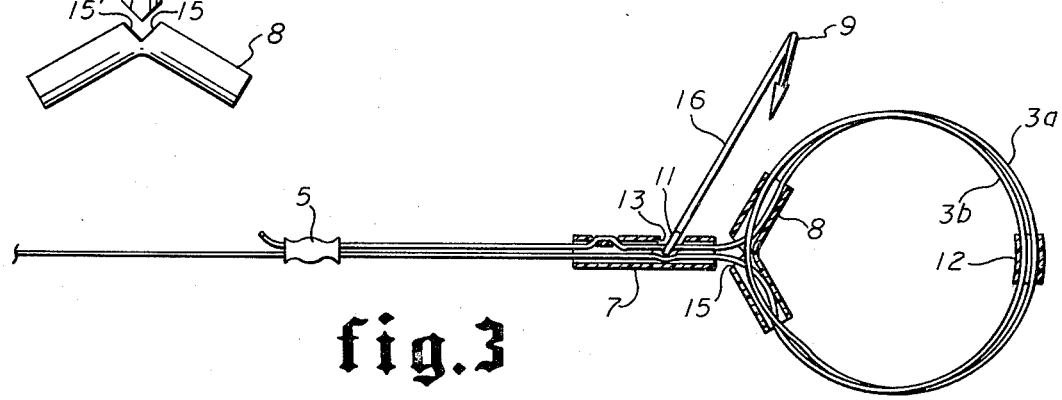
FIG. 3 is a partial sectional view of the preferred embodiment of the invention.

The preferred embodiment of the invention having two loops, is illustrated in FIG. 3. The adjustment body includes a second body 8. A tubular loop sleeve 8 is provided with a generally centrally located opening 15 therein. As best seen in FIG. 3, the loop sleeve contains a doubled end of the loop. The leader line 1 through the adjustment sleeve 7 enters the loop sleeve 8 through the opening 15. The line exits a first end of the loop sleeve 8 to form a first loop 3a. The line re-enters a second end of the loop sleeve 8, and exits the first end of sleeve 8 to form a second loop 3b. The second loop 3b passes through the opening 15, and through the adjustment sleeve 7, to the crimping sleeve 5. A tube 12 may be provided mounted around the loops 3a, 3b for opening the loops, as shown, or a similar tube may be provided on each of the loops 3a, 3b (not shown). A loop sleeve formed from a resilient plastic tube has proved to function quite well.

Figure 2:
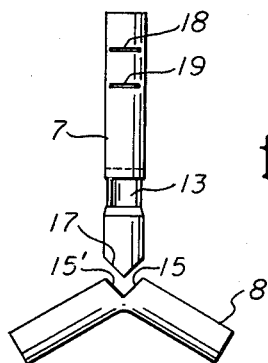
FIG. 2 is a plan view of the sleeves of the invention.

The opening 13 in the adjustment sleeve 7 is preferably an angled slot, as best seen in FIGS. 2 and 3. Mounting the eye 11 of the hook 9 in the angled slot causes the hook to angle with respect to the adjustment sleeve 7 and leader 10. The angled slot 13 is preferably formed to cause the point of the hook to lie near the body of the to bait to increase the chances of hooking a game fish taking the bait. As shown in FIG. 3, which illustrates a double hook 9 mounted in the adjustment sleeve 13, the angled slot 13 will cause the double hook 9 to "wrap around" the bait. Thus the points of the double hook 9 are close to the body of the bait where they are most likely to hook a game fish.

It should be noted that the loops 3a, 3b of FIG. 3 are illustrated in a plane parallel to the drawing for clarity of illustration. It is generally preferable that the loops 3a, 3b be oriented 90 degrees from the view of FIG. 3 so the points of the double hook 9 lie each on one side the bait.

As shown in FIG. 2, the optimum orientation of the hook 9 and the loops is obtained by providing the adjustment sleeve 7 with a pointed end 17, as shown in FIGS. 2 and 3. The end 17 cooperatively engages with an oppositely configured notch 15 functioning as the opening formed in the loop sleeve 8.

Sliding the adjustment sleeve 7 toward the loop to grip a bait urges the end 17 into cooperative engagement with the notch 15 and prevents the rotation of the loops with respect to the adjustment sleeve. Naturally, by appropriately forming the point 17 on the adjustment sleeve, the loops may be retained in any desired position with respect to the hook 9.

In operation a bait, for example a, live shrimp, is placed in the loop. The adjustment sleeve is urged toward the bait to close the loop and grip the shrimp. The bait is then cast or otherwise presented the game fish in the usual manner. Because of the new and novel means of retaining the bait without injuring it, a more appealing lure is presented. Further, because the hook is situated close to the bait and at an optimum location, a better opportunity for hooking the game fish is obtained. After a fish is hooked and landed, the tab 12 and the adjustment sleeve 7 and loop sleeve 8, are pulled apart to open the loop 3 and insert another bait.

Figure 4:
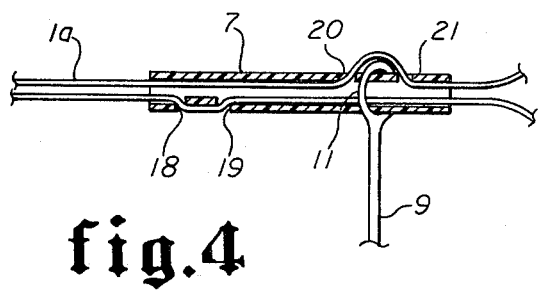
FIG. 4 is a partial sectional view of a third embodiment of the invention.

FIG. 4 illustrates another embodiment of the leader of the invention wherein the adjustment sleeve 7 is mounted through the eye 11 of the hook. In this embodiment, the hook 9 is thus generally perpendicular to the longitudinal axis of the sleeve 7. A first opening 20 and a second opening 21 are formed through the adjustment sleeve 7 so the line 1a may exit and re-enter the sleeve 7 to secure the hook 9 to the leader.

Figure 5:
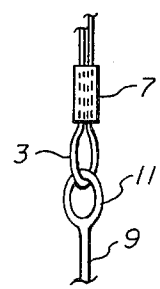
FIG. 5 is a partial sectional view of a fourth embodiment of the leader of the invention.

FIG. 5 illustrates yet another embodiment of the invention wherein the eye 11 of the hook is on the loop. The adjustment sleeve 7 is slidable toward the hook 9 to grip a bait in the loop 3. The adjustment sleeve may have openings 18, 19 formed therein to provide frictional resistance to slipping of the adjustment sleeve 7, or the sleeve may be sized so that it fits snuggly and tightly around the lines of the leader.

From the foregoing, it will be seen that this invention is one well adapted to obtain all the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in a limiting sense.

The invention having been described, what is claimed is:

1. A leader for gripping bait, comprising:
   a line having a loop formed therein,
   a tubular adjustment sleeve slidably mounted on the loop, said sleeve having a laterally opening slot therein, and
   a fishing hook having an eye mounted on the line within the sleeve and extending outwardly through the slot, whereby adjusting the loop firmly around a bait grips the bait adjacent the hook.

2. The structure as set forth in claim 1 including a slidable body mounted on the loop whereby the body provides a grip for pulling the loop and the adjustment body to enlarge the loop.

3. The structure as set forth in claim 1 wherein the slot is angled relative to the adjustment sleeve such that the point of the hook lies adjacent the loop. pg,12

4. The structure as set forth in claim 1 including:
a second sleeve mounted on the loop adjacent said first sleeve, said second sleeve receiving a doubled end of the loop for enabling better retention of the bait adjacent the hook.

5. The structure of claim 1 wherein said adjustment sleeve includes means for gripping the line to prevent movement of the line and thus further enabling retention of the hook and bait adjacent to each other.

6. The structure as set forth in claim 5 wherein said gripping means includes first and second openings formed therein wherein the line is positioned out of the sleeve through the first opening and into the sleeve through the second opening whereby the line is gripped by the adjustment sleeve to enable retention of the hook and bait adjacent each other.

7. The structure as set forth in claim 4 including orienting means for positioning the first sleeve relative to the second sleeve to position a point of the hook adjacent the bait.

* * * * *